Figure 1:
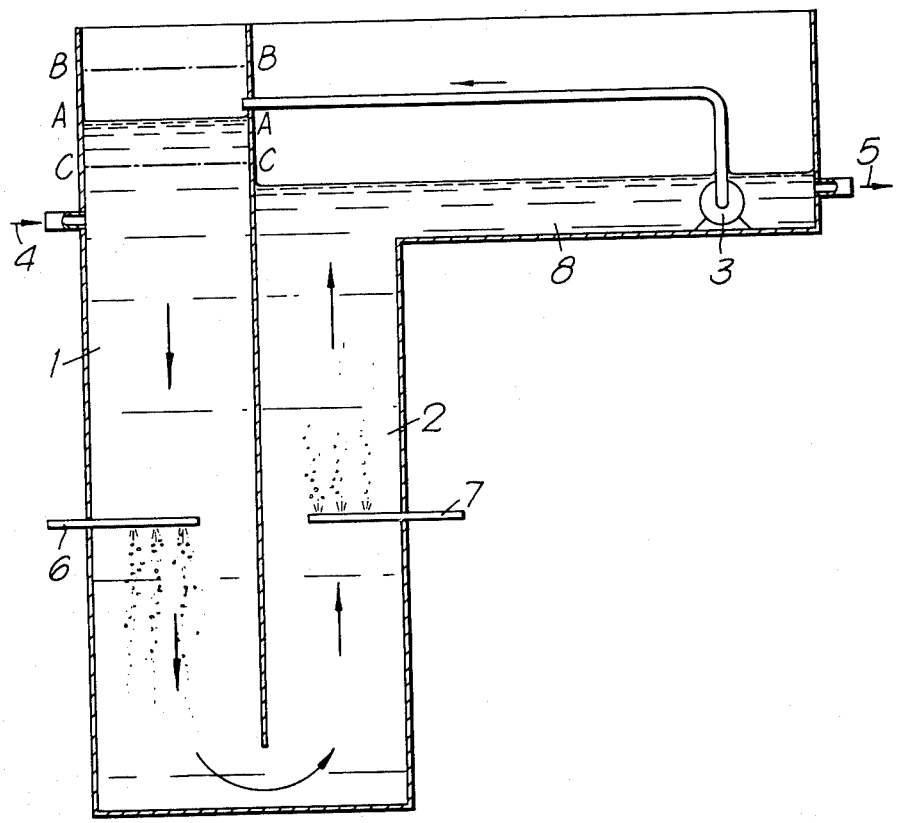

United States Patent [19]

Hines et al.

[11] 4,297,217

[45] Oct. 27, 1981

[54] TREATMENT OF WASTEWATER

[75] Inventors: David A. Hines, Bishopton; David H. Bolton, Linthorpe, both of England

[73] Assignee: Imperial Chemical Industries Limited, London, England

[21] Appl. No.: 149,622

[22] Filed: May 12, 1980

[30] Foreign Application Priority Data

May 23, 1979 [GB] United Kingdom ............... 17971/79

[51] Int. Cl.³ .............................................. C02F 3/22
[52] U.S. Cl. .................................... 210/621; 210/614; 210/629; 210/97; 210/195.1; 210/199; 261/29
[58] Field of Search ........................................ 210/2–9, 210/14, 15, 60, 63 R, 97, 195.1, 195.3, 198 R, 199, 205, 220, 258, 601, 614, 620, 621, 622, 623, 626, 629, 758, 765, 198.1, 744; 261/29, 36 R

[56] References Cited

U.S. PATENT DOCUMENTS

| | | | |
|---|---|---|---|
| 3,642,615 | 2/1972 | Wieferig | 210/7 |
| 3,804,255 | 4/1974 | Speece | 261/29 |
| 3,878,097 | 4/1975 | Mochizuki et al. | 210/195.3 |
| 3,910,838 | 10/1975 | kaelin | 210/7 |
| 4,086,160 | 4/1978 | Roesler | 210/7 |
| 4,207,180 | 6/1980 | Chang | 210/7 |
| 4,253,949 | 3/1981 | Hines et al. | 210/703 |

FOREIGN PATENT DOCUMENTS

| | | | |
|---|---|---|---|
| 54-121565 | 9/1979 | Japan | 210/195.3 |
| 7406507 | 11/1974 | Netherlands | 210/195.3 |

OTHER PUBLICATIONS

Speece, "U-tube Stream Reaeration," *Public Works* Aug. 1969, pp. 111-113.

*Primary Examiner*—Peter A. Hruskoci
*Attorney, Agent, or Firm*—Cushman, Darby & Cushman

[57] ABSTRACT

A method and apparatus for the treatment of wastewater in which the wastewater is circulated around a system comprising a downcomer and a riser communicating with each other at their lower ends, the level of the wasterwater in the downcomer being maintained above the level of the wastewater in the riser and providing a hydrostatic pressure head which causes circulation of the wastewater around the system at a pre-selected rate, a gas containing free oxygen is supplied to the wastewater as it passes through the downcomer, and the wastewater is pumped from, or form near, the top of the riser back into the downcomer (or vessel communicating therewith) at a position(s) above the highest level to which the wastewater in the downcomer can fluctuate during normal operation of the system when operating at maximum load.

7 Claims, 5 Drawing Figures

TREATMENT OF WASTEWATER

This invention relates to the treatment of liquid-borne biologically-degradable waste material, hereinafter referred to as wastewater which term is to be understood to include all types of biologically degradable domestic and industrial waste materials, for example normal domestic sewage, the effluents produced by farms, food factories and other industries producing such waste.

The methods generally employed in the treatment of wastewater comprise essentially a primary treatment by physical methods such as screening and sedimentation to remove large suspended solids followed by a secondary treatment by biological methods to remove organic materials. The present invention relates to a secondary treatment stage.

The present invention relates to a method for the treatment of wastewater of the kind which comprises the steps of circulating the wastewater around a system comprising a downcomer and a riser communicating with each other at their lower ends, the level of the wastewater in the downcomer being maintained above the level of the wastewater in the riser to provide a hydrostatic pressure head which causes circulation of the wastewater around the system, supplying a gas containing free oxygen to the wastewater as it passes through the downcomer, and pumping the wastewater from, or from near, the top of the riser back into the downcomer at or near the top thereof.

The present invention also relates to an apparatus for the treatment of wastewater of the kind comprising a downcomer and a riser communicating with each other at their lower ends, means for supplying a gas containing free oxygen to the wastewater as it passes through the downcomer, means for pumping the wastewater from, or from near the top of the riser back into the downcomer at or near the top thereof, to maintain the level of the wastewater in the downcomer above the level of the wastewater in the riser.

Figure 2:
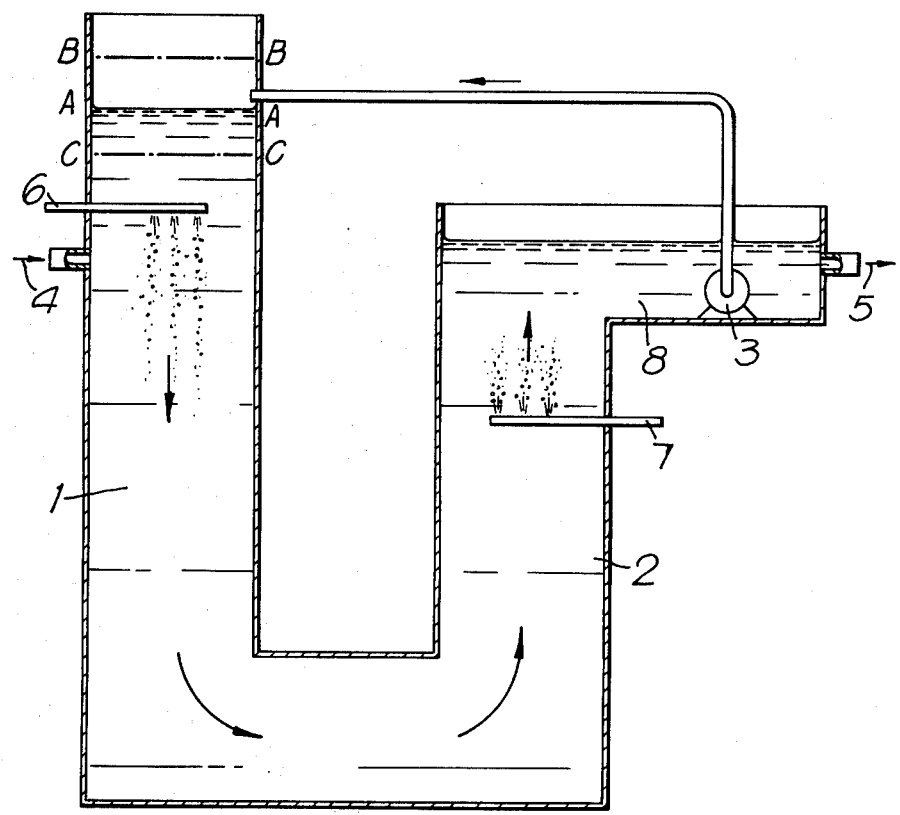
Figure 3:
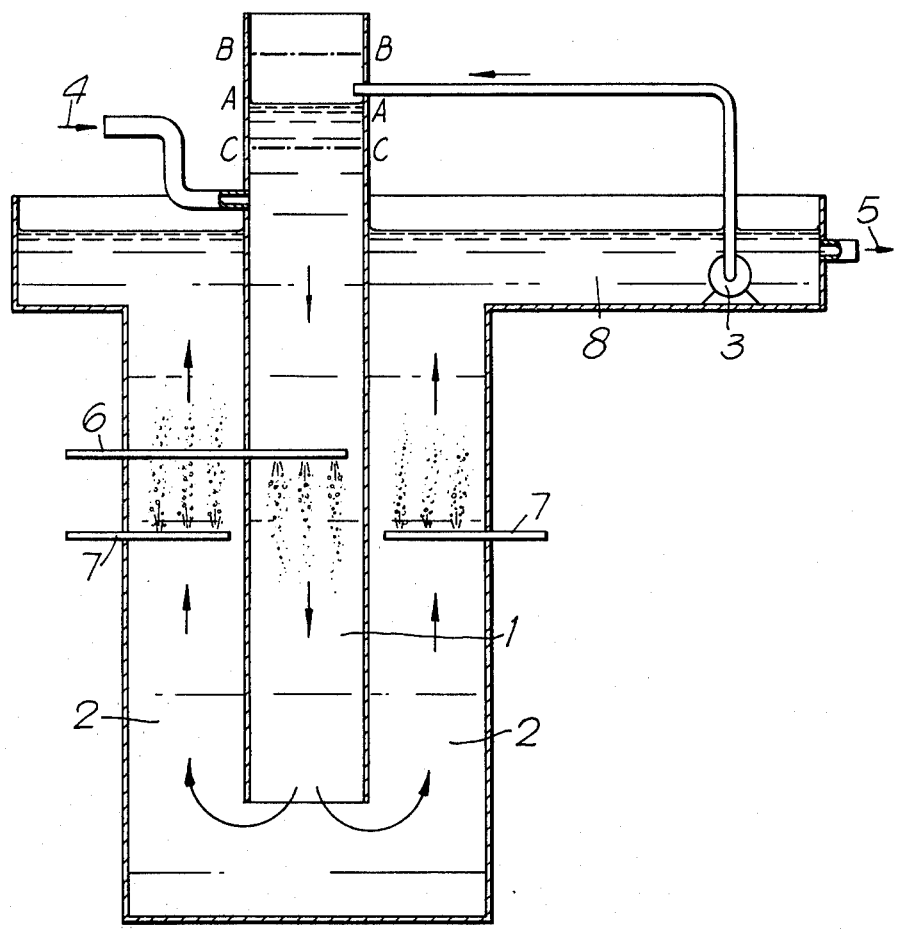
Figure 4:
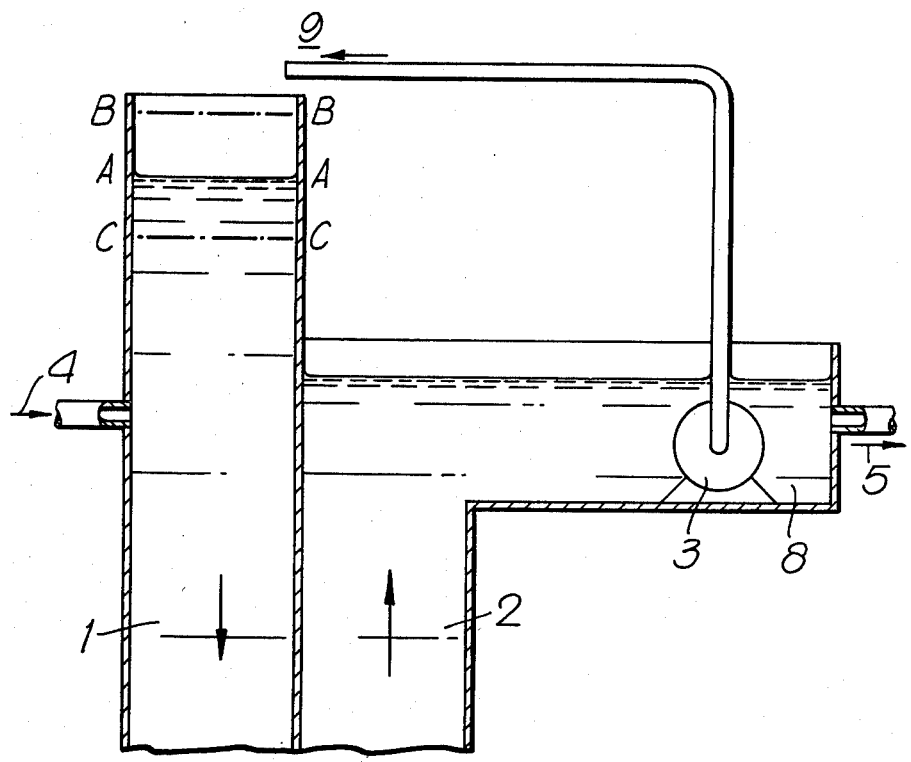
Figure 5:
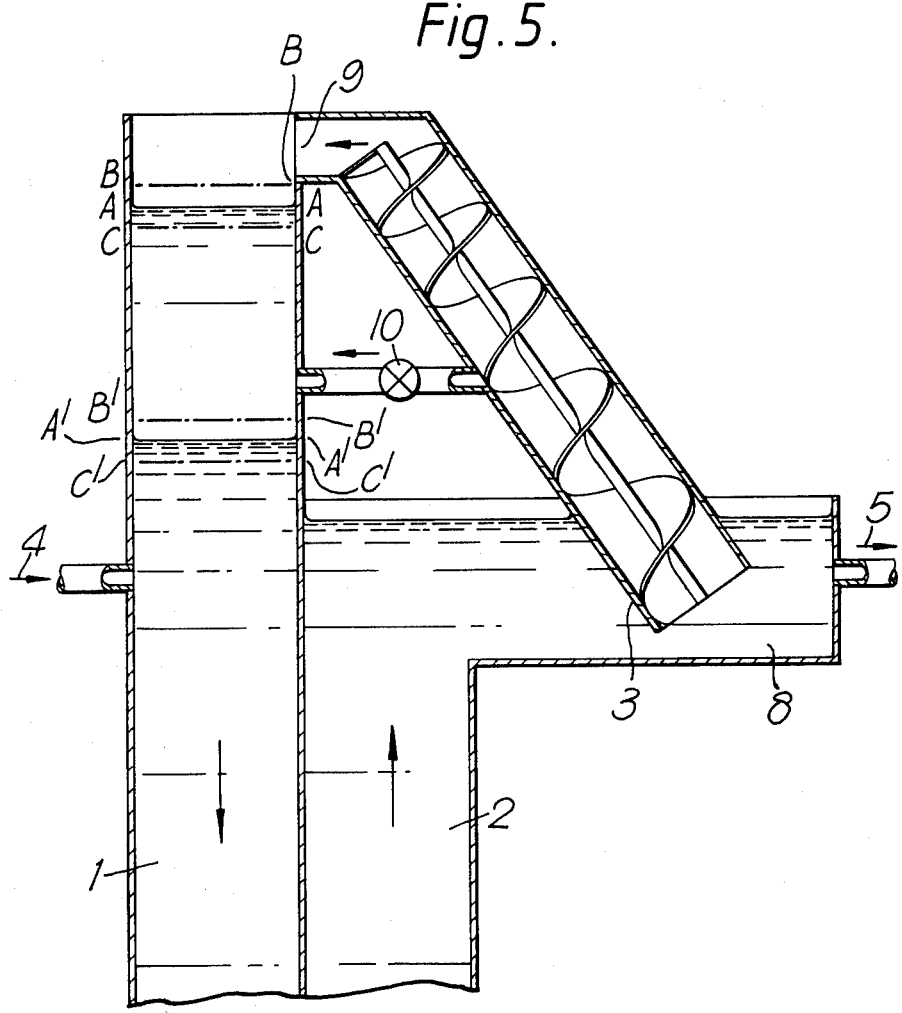

In the accompanying drawings, FIGS. 1, 2 and 3 illustrate, diagramatically, examples of the kind of apparatus for the treatment of wastewater suitable for use in the present invention, while FIGS. 4 and 5 illustrate, diagramatically, examples of modifications made thereto in accordance with the invention.

As illustrated in FIGS. 1, 2 and 3, the apparatus comprises a downcomer 1, a riser 2, and a pump 3 which recirculates wastewater from, or from near, the top of the riser 2 back into the downcomer 1 at or near the top thereof. Although the wastewater must be pumped up from the riser to a higher level in the downcomer, in the interests of power economy it is not pumped to a higher level than that required to achieve the desired rate of circulation around the system. Wastewater to be treated is introduced into the apparatus (preferably into the downcomer 1) at any desired rate at a convenient point 4 and, after being recirculated around the apparatus many times, treated wastewater is removed from the apparatus at substantially the same rate at any convenient point 5.

A gas containing free oxygen (for example air) is introduced into the downcomer 1 at such a rate and at any convenient point such that it is substantially all entrained by the downwardly flowing wastewater. Preferably the gas is introduced into the downcomer 1 at a point 6 between about one-tenth and six-tenths of the length of the downcomer measured from the surface of the wastewater therein. A gas containing free oxygen, for example air, may also be introduced into the riser 2, for example at 7.

Preferably the top of the riser 2 is of enlarged cross-section, forming a basin 8 in which most of the gas bubbles become disengaged from the wastewater and escape to the atmosphere before the wastewater reaches the pump 3. It is stressed that although it is necessary to disengage gas bubbles from the wastewater before it is pumped back into the downcomer, it is not essential to provide a basin for this purpose. If the pump is of a suitable type, e.g. an archimedean screw pump, gas disengagement will occur if the wastewater is pumped directly from the top of the riser 2 back into the downcomer.

The pump 3 may be of any type suitable for pumping the wastewater from the basin 8 up and back into the downcomer 1. Examples of suitable pumps are centrifugal pumps, axial flow pumps, and positive displacement pumps, for example archimedean screw pumps. The latter have the added advantage of causing further disengagement of gas bubbles from the wastewater and of not shearing flocs.

Under completely stable operating conditions, the level A—A of the wastewater in the downcomer 1 would be at a substantially constant height above the level of the wastewater in the basin 8, so that there would be a substantially constant hydrostatic pressure difference or pressure head between the two, which would cause the wastewater to flow down the downcomer 1 and up the riser 2 at a substantially constant rate. However, we have found that, in general, completely stable operating conditions do not occur and that there are temporary fluctuations in the pressure head, associated with temporary fluctuations in the rate of flow of the wastewater around the apparatus; these fluctuations usually rectify themselves and cause no undue disturbance of the flow pattern, so that the operating conditions can be fairly described as normal.

Let us suppose that the level of the wastewater in the downcomer 1 is at A—A and the rate of flow of wastewater around the system, starts to decrease due to a random fluctuation of some kind. This increases the voidage in the downcomer 1 (namely the proportion of air by volume in the air/liquid mixture) and further slows down the rate of flow of the wastewater around the system. while this slowing-down process is taking place, however, the level of the wastewater in the top of the downcomer 1 is gradually rising from its original level A—A (since the flow rate around the system is slower and the pump 3 is continuing to pump water into the top of the downcomer 1), with a corresponding increase in the hydrostatic pressure head, until it reaches a level, for example B—B, where the increased hydrostatic pressure head is sufficient to speed up the wastewater flow rate and restore it to its original value. Once this has been done, the wastewater level will gradually sink back from B—B to its original level A—A.

On the other hand, let us suppose that for some reason the wastewater flow rate starts to increase beyond its original rate. In this case, the level A—A will begin to fall, with a corresponding decrease in the hydrostatic pressure head, until it reaches a new lvel, for example C—C, at which point the hydrostatic pressure head is so reduced that the wastewater flow rate is slowed down again to its original value. Once this has been done, the wastewater level will gradually rise from C—C to its original level A—A. From the foregoing it will be understood that the lines A—A, B—B and C—C represent respectively the mean, the maximum and the minimum levels in the downcomer under normal operating conditions—that is to say that between the levels B—B and C—C fluctuations in the flow rate will rectify themselves without outside assistance. It will be appreciated that these levels will be different for any two different wastewater treatment systems and will depend upon a large number of different factors including, for example, the rates for which the apparatus is designed, the characteristics of the pump, the characterisitcs of the wastewater to be treated, and many other factors. These means, maximum and minimum levels can be determined for each wastewater treatment system.

Since it has hitherto been thought that during normal operation the level A—A remains substantially constant and it has not been realised that it may, in fact, fluctuate between B—B and C—C, it might be thought (referring to FIGS. 1 to 3) that the most suitable and economical level at which to pump the wastewater back into the downcomer would be at or near the mean level A—A. It would not be thought economical to pump it back into the downcomer at a level substantially higher than the mean level A—A since this would entail additional costs in power for driving the pump, which are already a major factor in the total cost of operating the system. Nevertheless, as we have shown above, it has now been realised that the mean level A—A can rise to the level B—B, and hence, in order to maintain normal circulation of wastewater and air around the system at the flow rate for which the system was designed, the pump must be capable of delivering wastewater back into the downcomer at a level substantially higher than A—A, and preferably at least as high as the level B—B.

The level B—B may be defined as the highest level to which the wastewater in the downcomer can fluctuate during normal operation of the system.

The present invention provides a method for the treatment of wastewater which comprises the steps of circulating the wastewater around a system comprising a downcomer and a riser communicating with each other at their lower ends, the level of the wastewater in the downcomer being maintained above the level of the wastewater in the riser and providing a hydrostatic pressure head which causes circulation of the wastewater around the system at a pre-selected rate, supplying a gas containing free oxygen to the wastewater as is passes through the downcomer, and pumping the wastewater from, or from near, the top of the riser back into the downcomer (or vessel communicating therewith) at a position or positions above the highest level to which the wastewater in the downcomer can fluctuate during normal operation of the system when operating at maximum load.

The present invention also provides an apparatus for the treatment of wastewater, comprising a downcomer and a riser communicating with each other at their lower ends, means for supplying a gas containing free oxygen to the wastewater as it passes through the downcomer, means for pumping up the wastewater from, or from near, the top of the riser and back into the downcomer (or vessel communicating therewith), the said pumping means being capable of pumping the wastewater back into the downcomer at a position or positions located at a level which is above the highest level to which the wastewater in the downcomer can fluctuate during normal operation of the apparatus when operating at maximum load.

FIG. 4 shows the upper portion of the apparatus of FIG. 1 duly modified in accordance with the present invention. It will be appreciated that FIGS. 2 and 3 can be modified in similar manner. In FIG. 4, the shaft had a depth of 80 meters and was designed for treating domestic sewage including industrial components and so that the waste water had an optimum mean velocity around the shaft of 0.6 m/sec., a minimum head range of 2.6 meters (that is to say, the height of the level C—C above the level of the wastewater in the basin 8), and a maximum head range of 3.1 meters (that is to say, the height of the level B—B above the level of the wastewater in the basin 8). The fluctuations of the level A—A therefore had an amplitude of 0.5 meters.

In FIG. 4, the pump 3 pumps the wastewater from the basin 8, at the top of the riser 2, up and back into the downcomer at 9, if necessary through a suitable vessel such as a conduit or casing (not shown). The position (or positions) 9 at which the wastewater re-enters the downcomer from the pump 3 is (or are) located above the level B—B, which is the highest level to which the wastewater in the downcomer can fluctuate during normal operation. There is therefore a break in the flow of the wastewater between the re-entry position(s) 9 and the level of the wastewater in the downcomer. The wastewater may be allowed to fall freely (as a waterfall) from 9. Such free-fall of the wastewater will cause it to entrain air, which is undesirable; therefore the wastewater is preferably caused to flow from 9 to the level of the wastewater in the downcomer through means which inhibit the entrainment of air, for example down a spiral chute (not shown).

As described above, the apparatus of FIG. 4 was designed for treating certain specific effluents, at specific rates, but it will be understood that, in general, an apparatus according to the invention will be designed to treat a range of effluents over a range of rates. Thus at certain times the apparatus may be carrying out its heaviest duty at its maximum capacity, in which case the mean level in the downcomer will be at A—A (but fluctuating between B—B and C—C) as soon in FIG. 4. At other times, however, it will be carrying out less than its heaviest duty at less than its maximum capacity, in which case the mean level in the downcomer will be at $A^1$—$A^1$ (but fluctuating between $B^1$—$B^1$ and $C^1$—$C^1$) as shown in FIG. 5. In this case it would be wasteful to pump the wastewater back into the downcomer at the highest point B—B when it is only necessary to do so at $B^1$—$B^1$.

This difficulty can be overcome as shown in FIG. 5, wherein the pump 3 is an archimedean screw pump. When the mean level in the downcomer is at A—A, the wastewater is delivered from the top of the pump into the downcomer just above the level B—B. The pump is, however, provided with valve means or the like 10, which can be opened when the mean level sinks to $A^1$—$A^1$ so that the pump then delivers wastewater through 10 at a level just above $B^1$—$B^1$. The changeover from using the whole of the pump 3 to using only the bottom end thereof (and vice versa) can be effected manually as and when desired; or it may be effected by a time switch (not shown), if it is known in advance when the change from level A—A to $A^1$—$A^1$ (or vice versa) is going to take place—as in the case of installations for treating domestic sewage; or it may be effected by means (not shown) responsive to signals derived from the level of the wastewater in the downcomer, such that when it sinks below the level $B^1$ and $B^1$ the valve means 10 is opened and when it rises above the level $B^1$—$B^1$ the valve means 10 is closed. Since the level of the wastewater in the downcomer is a function of the amount of oxygen-containing air being supplied to the apparatus, the opening and closing of the valve means 10 may be operated by a signal responsive to an increase or decrease in this parameter. There may be a plurality of such valve means located between the top of the pump 3 and the illustrated valve means 10 so that the wastewater may be removed from the pump into the downcomer at a plurality of different levels depending upon the type of duty the apparatus is carrying out.

An alternative (not illustrated) would be to have two separate pumps 3, one delivering wastewater into the downcomer just above the level B—B, and the other delivering wastewater into the downcomer just above the level $B^1$—$B^1$, with means for starting and stopping them alternately. Self-evidently there may be additional pumps delivering waste water into the downcomer at levels intermediate B—B and $B^1$—$B^1$.

We claim:

1. A method for treating wastewater utilizing a downcomer-riser system, the downcomer and riser communicating directly only at their lower ends and indirectly, through a pump means, only at their upper ends, with the level of wastewater in the downcomer being maintained above the level of wastewater in the riser to provide a hydrostatic pressure head which causes circulation of the wastewater around the system at a pre-selected rate, the level of wastewater in the downcomer fluctuating between a maximum and minimum level for which self-rectification of the flow rate will occur, said method comprising the steps of:
  supplying a gas containing free oxygen to the wastewater in the downcomer as it circulates down the downcomer;
  effecting disengagement of gas bubbles from the wastewater prior to recirculation from the riser to the downcomer;
  pumping the wastewater from an upper portion of the riser back into the downcomer so that the wastewater is discharged into the downcomer at an area above said level of wastewater, and varying the position at which the wastewater is discharged into said downcomer in response to said level of wastewater.

2. A method as recited in claim 1 wherein said pumping step is practiced so that the wastewater is allowed to fall freely from its area of discharge to the downcomer.

3. A method as recited in claim 1 wherein said pumping step is accomplished by delivering the wastewater from the riser to the downcomer while inhibiting the entrainment of air therein.

4. Apparatus for treating wastewater, comprising:
  a downcomer;
  a riser communicating directly with said downcomer only at the bottom ends of said riser and downcomer, and communicating indirectly only at the upper ends thereof;
  a level of wastewater being maintained in said downcomer above the uppermost part of said riser so that a hydrostatic head is provided effecting circulation of wastewater down said downcomer and up said riser, at a pre-selected rate, and the level of wastewater in said downcomer fluctuating between maximum and minimum levels for which self-rectification of the flow rate around the system will occur;
  oxygen-containing gas introducing means disposed in said downcomer for introducing oxygen-containing gas into the wastewater circulating down said downcomer;
  pumping means for pumping wastewater from an upper portion of said riser back into said downcomer so that the wastewater is discharged into the downcomer at an area above said level of wastewater, and means for varying the position at which the wastewater is discharged into said downcomer in response to said level of wastewater.

5. Apparatus as recited in claim 4 wherein said pumping means comprises means for inhibiting the entrainment of air in the wastewater during pumping and discharge thereof from said riser into said downcomer.

6. Apparatus as recited in claim 5 wherein said pumping means includes a spiral chute.

7. Apparatus as recited in claim 4 wherein said pumping means includes a first conduit extending from said riser to said discharge area of said wastewater to said downcomer; a second conduit extending from said first conduit to said downcomer at a lower point of said downcomer than said area where said first conduit discharges wastewater to said downcomer; and valve means disposed in said second conduit.

\* \* \* \* \*